US009304950B2

United States Patent
Pillai et al.

(10) Patent No.: US 9,304,950 B2
(45) Date of Patent: Apr. 5, 2016

(54) OVERCLOCKED LINE RATE FOR COMMUNICATION WITH PHY INTERFACES

(71) Applicant: Broadcom Corporation, Irvine, CA (US)

(72) Inventors: Velu Pillai, Austin, TX (US); Vivek Telang, Austin, TX (US)

(73) Assignee: BROADCOM CORPORATION, Irvine, CA (US)

( * ) Notice: Subject to any disclaimer, the term of this patent is extended or adjusted under 35 U.S.C. 154(b) by 714 days.

(21) Appl. No.: 13/628,067

(22) Filed: Sep. 27, 2012

(65) Prior Publication Data

US 2014/0075076 A1     Mar. 13, 2014

Related U.S. Application Data

(60) Provisional application No. 61/700,015, filed on Sep. 12, 2012.

(51) Int. Cl.
| | |
|---|---|
| G06F 13/14 | (2006.01) |
| G06F 13/40 | (2006.01) |
| H04L 12/40 | (2006.01) |
| H04L 25/00 | (2006.01) |
| H04L 29/06 | (2006.01) |
| H04L 25/49 | (2006.01) |

(52) U.S. Cl.
CPC ............ *G06F 13/14* (2013.01); *G06F 13/4072* (2013.01); *H04L 12/40* (2013.01); *H04L 25/00* (2013.01); *H04L 69/08* (2013.01); *H04L 25/4906* (2013.01); *Y02B 60/1228* (2013.01); *Y02B 60/1235* (2013.01)

(58) Field of Classification Search
CPC ..... G06F 13/14; G06F 13/4072; H04L 69/08; H04L 12/40; H04L 25/00
See application file for complete search history.

(56) References Cited

U.S. PATENT DOCUMENTS

| | | | |
|---|---|---|---|
| 8,218,537 B1 * | 7/2012 | Gui et al. | 370/369 |
| 2002/0015442 A1 * | 2/2002 | Takeuchi et al. | 375/211 |
| 2009/0116839 A1 * | 5/2009 | Kikuchi et al. | 398/79 |
| 2012/0033760 A1 * | 2/2012 | Zheng et al. | 375/296 |
| 2013/0196598 A1 * | 8/2013 | McCormack et al. | 455/41.1 |

OTHER PUBLICATIONS

Healey, Adam and Morgan, Chad, "A Comparison of 25 Gbps NRZ & PAM-4 Modulation Used in Legacy & Premium Backplane Channels", TE Connectivity, 2012, US, 16 pages, available on-line at http://www.te.com/content/darn/te/global/english/tradeshow/designcon/designcon-2012-whitepaper-chadmorgan.pdf.

\* cited by examiner

*Primary Examiner* — Nimesh G Patel
(74) *Attorney, Agent, or Firm* — Garlick & Markison; Edward Marshall

(57) ABSTRACT

A system side interface of a PHY chip used in conjunction with a 100 GBASE backplane, sends and receives data using an NRZ signal format, but at a data rate of between about 26.5 Gbps/per lane to 27.2 Gbps/per lane, which is consistent with the PAM 4 signaling protocol. Thus, chip-to-chip communications between a PHY chip and a switch or controller chip can use an "overclocked" NRZ signaling format, reducing the amount of logic needed, which in turn can reduce signal latency, and reduce the chip area and power consumption required to implement the logic.

20 Claims, 6 Drawing Sheets

US 9,304,950 B2

OVERCLOCKED LINE RATE FOR COMMUNICATION WITH PHY INTERFACES

CROSS REFERENCE TO RELATED PATENTS/PATENT APPLICATIONS

This application claims priority pursuant to 35 U.S.C. §119(e) to U.S. Provisional Patent Application No. 61/700,015, filed Sep. 12, 2012, and entitled "OVERCLOCKED LINE RATE FOR COMMUNICATION WITH PHY INTERFACES," which is hereby incorporated herein by reference in its entirety and made part of the present U.S. Utility Patent Application for all purposes.

BACKGROUND

1. Field

This invention relates generally to signaling formats and encoding, and more particularly to signaling formats and encoding used for communication with PHY interfaces.

2. Related Art

Currently IEEE 802.3bj allows the use of two different signaling formats in conjunction with 100 Gb/s backplane PHYs: pulse amplitude modulation (PAM4), and non-return to zero (NRZ). In general the 100 Gb/s standard, as described in IEEE 802.3bj splits a 100 Gb/s signal into multiple different lanes, with each lane operating at a fraction of the full 100 Gb/s frequency. For example, the 100 Gb/s signal can be spread across into four lanes, each running at about 25 Gb/s. Where the system side data lanes are formatted using an NRZ protocol, PHY interfaces are used to convert NRZ data on the system side to PAM4 on the line side, and conversely from PAM4 on the line side back to NRZ system side.

An example of an external PHY 100 is illustrated in prior art FIG. 1. PHY 100 includes an egress path 101, and ingress path 151, internal control/test paths 171, and automatic negotiation and PHY configuration block 173 as specified by various IEEE standards. As illustrated in FIG. 1, four lanes of NRZ data clocked at 25.78 Gb/s are received at serializer/deserializer (serdes) 103, which forms part of egress path 101. Serdes 103 performs the serializer/deserializer functions and transmits the data, still in four-lane NRZ signaling format, to the 100 G data path 105, which includes 40 Gb attachment user interface (XLAUI) Rx PCS 106, 100 G Tx PCS 108, FEC encoder 110, and PAM4 Tx 112. XLAUI Rx PCS 106 aligns, deskews, and descrambles the NRZ data, and serves as a retiming interface, which can change the number of lanes used to transmit the data, if needed. XLAUI Rx PCS 106 essentially decodes the NRZ data. 100 G Tx PCS 108 inserts alignment blocks into the deskewed data for later use by a receiver in deskewing the data. The FEC encoder 110 applies forward error correction techniques to the data, and sends the data to PAM Tx 112, which transcodes the FEC encoded data into the 256b/257b data blocks used by PAM4.

After the data has been encoded according to the PAM4 protocol, the data is sent to Tx AFE (analog front end) 107, which modulates the data at a rate of between about 26.5 Gbps/per lane to 27.2 Gbps/per lane and physically puts the data onto the backplane trace. Thus, the data enters PHY 100 on the system side in an NRZ signaling format at 25.78 Gb/s, and leaves PHY 100 on the line side at between about 26.5 Gbps/per lane to 27.2 Gbps/per lane in a PAM4 format.

A similar procedure is performed, except in reverse, when PAM4 data is received on the line side of PHY 100 using ingress path 151 and converted to NRZ data for output on the system side of PHY 100. PAM 4 data is received at RX AFE 157, and sent through the 100 G data path 155 for conversion to NRZ and output by serdes 153. PAM4 RX 162 decodes the data from the PAM4 format, FEC decoder 160 uses the REC information as necessary to perform error correction functions, 100 G RX PCS transcodes the data from 512b/514b format to the 64b/66b format, and XLAUI TX PCS adds alignment blocks to the data for later deskewing and adjusts the number of lanes as needed.

Unfortunately, current techniques used to convert NRZ data to PAM 4 data can require a significant amount of overhead and processing time, thereby rendering the current techniques less than optimal.

DETAILED DESCRIPTION

As used herein, the following terms are to be given their ordinary meaning, unless otherwise specified or apparent from the context in which the terms are used. The term "encode" and its derivatives are generally used herein to refer to the logical structure of data; encoding data may include using various markers, tags, and the like. The term "signaling format" is generally used herein to refer to the physical structure of the data. For example, many different logical data structures can be physically transmitted using a non-return to zero (NRZ) signaling format. Likewise, a single logical data structure can be physically represented using both a pulse amplitude modulated (PAM) signaling format and an NRZ signaling format. The differentiation of the terms "encoding" and "signaling format" may not hold in all circumstances, particularly when using the terms in a general sense. For example, in some instances the terms "encoding" and "format" may be used loosely, as synonyms, or the term "protocol" may be used to refer to a set of standards that specifies both logical and physical formatting requirements.

The term "overclock," and its derivatives is used herein to refer generally to an increase in the data rate of a signal. Overclocking is not intended to imply that the hardware or circuitry of a chip or device must be supplied with a master clock signal to cause an increase in the number of instructions executed by the chip each cycle.

Figure 2:
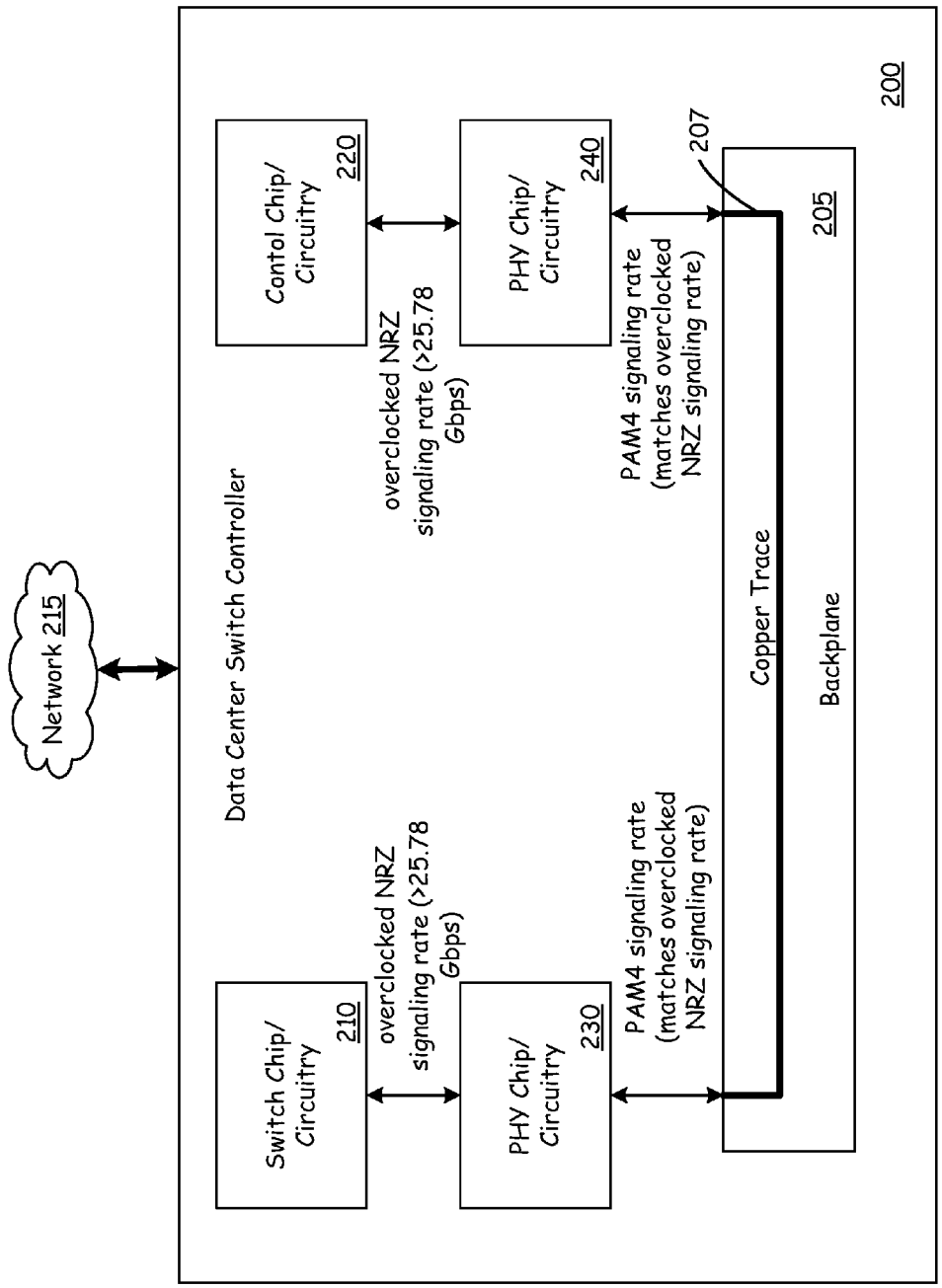
FIG. 2 illustrates a data center switch controller using PHY circuitry/chips to interface with a backplane according to various embodiments of the disclosure.

Referring now to FIG. 2, a data center switch controller 200 coupled to a network 215 is illustrated and discussed according to various embodiments of the present disclosure. Data center switch controller 200 includes a backplane 205 which in turn includes a copper trace 207, which conforms to the requirements of IEEE 802.3bj, which currently specifies that 100 Gbase communications should be supported over copper traces having a maximum length of 1 m and terminations at both ends. Data center switch controller 200 also includes a switch Chip/circuitry 210 and a control chip/circuitry 220 configured to communicate with each other over copper trace 207 included in backplane 205. Current IEEE standards allow for backplane 205 to implement PAM4 signaling. However, many switches and controllers currently communicate using NRZ signaling. Thus, both switch Chip/circuitry 210 and control chip/circuitry 220 may use a corresponding PHY chip/circuitry 230 or 240. In the embodiment illustrated in FIG. 2, switch Chip/circuitry to 10 communicates with PHY chip circuitry 230 using an NRZ signaling format with a data rate that has been altered to match the data rate of PAM4 signaling format. In other words, the data is physically represented in a nonreturn to zero format between switch Chip/circuitry 210 and PHY chip/circuitry 230, but rather than using the normal frequency for NRZ signaling format, which is currently about 25.78 Gb/s per lane, the NRZ signal is "overclocked" to match the PAM4 standard. Communication between control chip circuitry 220 and PHY chip/circuitry 240 is also performed in an NRZ signaling format overclocked to 27.2 Gb/s The standard for the PAM4 signaling format is still being finalized, with signaling data rates of between about 26.5 Gbps/per lane to 27.2 Gbps/per lane are being currently considered. The techniques disclosed herein can be used not only within the currently considered range of PAM4 signaling rates, but also with rates outside the range of rates being currently considered. For ease of reference, the PAM4 rate will be referred to herein as 27.2 Gbps/per lane, but should be considered to include frequencies outside that range as well. Similar considerations apply to the NRZ signaling format standard, which may change over time to include frequencies other than 25.78 Gbps.

Both PHY chip/circuitry 230 and PHY chip/circuitry 240 convert the NRZ signaling format received at their system side to a PAM4 signaling format having the same frequency, i.e. 27.2 Gb/s, on the line side. Thus, PHY chip/circuitry 230 receives NRZ data clocked at 27.2 Gb/s, converts the NRZ signaling format to PAM4 signaling format for transmission over copper trace 2072 PHY chip/circuitry to 40. PHY chip/circuitry 240 receives the 27.2 Gb/s PAM4 data at its line side, and converts the PAM4 data to NRZ signaling format data clock to 27.2 Gb/s for transmission to control chip/circuitry 220. Control chip/circuitry 220 can likewise send data to switch Chip/circuitry 210 using the same process.

Although at least one embodiment uses the NRZ signaling format "overclocked" to a frequency of 27.2 Gb/s for communications between a PHY chip/circuitry 230 or 240 and switch chip/circuitry 210 or control chip/circuitry 220, similar principles can be used to implement embodiments that use different clock speeds and different signaling formats consistent with other current or future standards promulgated by IEEE or another standards body.

Figure 3:
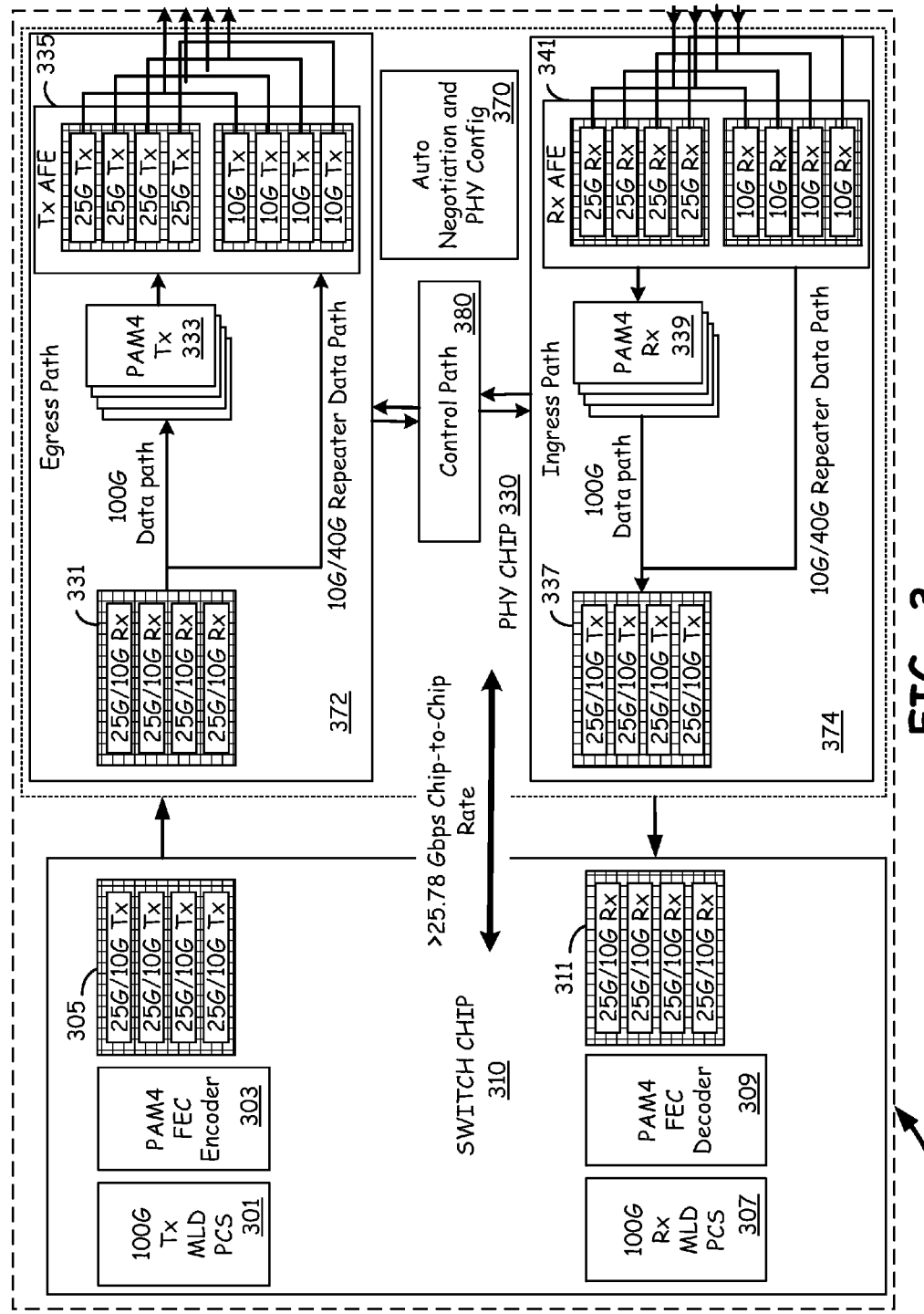
FIG. 3 illustrates a Switch Chip and a PHY chip communicating using "overclocked" NRZ data, with the FEC circuitry included in the Switch Chip, according to various embodiments of the disclosure.

Referring next to FIG. 3, a system 300 that uses overclocked NRZ data for communication between a switch chip 310 and a PHY chip 330 is illustrated and discussed. This discussion applies to various system types that use a PHY chip or device to interface with a backplane or other physical medium. For example, system 300 can be a data switch center controller, such as that illustrated in FIG. 2, a repeater, a gateway, a bridge, or some other type of device. Some such devices can also include either or both wired or wireless data transfer functionality on the system side, and may include an additional wireless or wired interface modules (not illustrated) that perform encoding and formatting of wireless communications for use by switch chip 310. Furthermore, although a switch chip is used for purposes of the present discussion, the techniques and teachings discussed herein can also be applied where a control chip, or other type of chip, is substituted in place of the switch chip. Additionally, although the term "chip" is used, switch chip 310 and PHY chip 3330 may be circuit boards, stand alone devices, or circuitry and logic implemented as part of a communication system.

Switch chip 310 includes 100 G Tx MLD PCS module 301 and 100 G Rx MLD PCS module 307; PAM4 FEC encoder module 303 and PAM4 FEC decoder module 309; and NRZ serdes modules 305 and 311. PHY chip 330 includes NRZ serdes modules 331 and 337; PAM4 Tx module 333 and PAM4 Rx module 339; and TX AFE module 335 and Rx AFE module 341, which may also be known as PAM4 serdes modules.

In the illustrated embodiment, switch chip 310 receives 100 Gb/s data to be delivered to, or received from, another chip, circuit board, or other device via a 100 GBASE compliant backplane that supports PAM4 signaling. Rather than using standard rate NRZ signaling at 25.78125 Gb/s/per lane for communication between switch chip 310 and PHY chip 330, the illustrated embodiment at least partially encodes the data using PAM4 encoding techniques, and transmits the PAM4 encoded data using an NRZ signaling format with a data rate adjusted to 27.2 Gbps.

For purposes of this discussion, the left side of FIG. 3 is referred to as the system side, while the right side is referred to as the line side. Switch chip 310 receives multiple lanes of 100 GBASE data at the system side, sends the data to PHY chip 330 to be transmitted via a 100 GBASE compliant backplane 305 (see FIG. 3) using a signaling format different than the signaling format used for communication between switch chip 310 and PHY chip 330. For data to be received by switch chip 310 from the line side, PHY chip 330 receives multiple lanes of data from backplane 305 (see FIG. 3) and transmits the data to switch chip 310 using a different signaling format than that used by backplane 305 (see FIG. 3).

In at least one embodiment, the signaling format used for communication between PHY chip 330 and the backplane 305 (see FIG. 3) is PAM4, which according to the PAM4 standard uses a data rate of 27.2 Gb/s/lane, and the signaling format used between switch chip 310 and PHY chip 330 is NRZ signaling format. However, rather than using the standard data rate of the NRZ signaling format, which is 25.78125 Gb/s, inter-chip communications employ a data rate of 27.2 Gb/s—which matches the PAM4 data rate used on the line side of PHY chip 330. In other embodiments, backplane 305 (see FIG. 3) the system can be configured for use with different standards that use, for example, different signaling formats and protocols, including different data rates. In some such embodiments, where one signaling format is used for the line side of switch chip 310 and another is used for the line side of PHY chip 330, the data rate used for inter-chip (or inter-device) communications can be adjusted up or down to match the data rate used on the line side of PHY chip 330.

Data received at switch chip 310 is processed by 100 G Tx MLD PCS module 301, PAM4 FEC encoder module 303, and serializer/deserializer (serdes) module 305. 100 G Tx MLD PCS module 301 performs transmit (multilane distribution) MLD and (physical coding sublayer) PCS functions. Multilane distribution functions generally include distributing data across "n" PCS lanes, 66 blocks at a time, and adding alignment blocks to each PCS lane for later deskewing. The number of lanes used can vary depending on the frequency and the data rate. For example, 100 Gbe can use 4 PCS lanes at about 35 Gb/s or 30 PCS lanes of about 5 Gb/s.

PAM4 FEC encoder module 303 is used to encode the data using forward error correction techniques. A PAM4 FEC encoded data frame can include, for example, a correctable payload and parity bits formatted in an FEC frame structure.

The PAM4 FEC encoded data output by PAM4 FEC encoder 303 is sent to serdes 305, which uses an "overclocked" NRZ signaling format to send the data to PHY chip 330. The data rate used for data transfer between switch chip 310 and PHY chip 330 is, in at least one embodiment, 27.2 Gb/s/lane (when 4 lanes are used), which is consistent with the PAM4 signaling data rate rather than the standard NRZ data rate of 25.78 Gbps/lane (when 4 lanes are used). As illustrated by the previous discussion, in at least one embodiment the NRZ protocol is not terminated. Instead, the NRZ data is encoded at a higher transcoding ratio, to match the line rate of the PAM-4 data. By not terminating the NRZ protocol, the amount of processing required can be reduced, yielding reduced latency, savings in chip real-estate, and related savings in processing power.

PHY chip 330 includes an egress path 372, an ingress path 374, internal control path 380, and Auto negotiation and PHY configuration block 370. PHY chip 330 receives the overclocked NRZ data at serdes 331, which sends 100 G data to PAM4 Tx module 333 and 10 G/40 G repeater data to Tx AFE module 335. PAM4 Tx module 333 transcodes the FEC encoded data into the 256b/257b data blocks used by PAM4. Tx AFE module 335 modulates the PAM4 encoded data at 27.2 Gb/s, and physically puts the data onto the backplane.

PHY chip 330 can also receive from the backplane encoded in PAM4 and using the PAM4 signal formatting. Rx AFE module 341 extracts the PAM4 encoded data from the physical signal, and sends the data to PAM4 Rx module 339, which decodes the PAM4 encoded signal to generate PAM4 FEC encoded data. The PAM 4 FEC encoded data is sent to serdes 337, which formats the PAM4 FEC encoded data into an overclocked NRZ signal format, and transmits the data to switch chip 310.

Switch chip 310 receives the overclocked NRZ data at serdes 311, decodes the PAM4 FEC encoded data at PAM4 FEC decoder module 309, and then performs Rx MLD and PCS functions at 100 G Rx MLD PCS module 307. The Rx MLD PCS functions include alignment an static skew compensation using the alignment blocks inserted during the Tx MLD PCS process by a transmitting device, and mapping "n" line side PCS lanes back to "m" system side lanes, as necessary.

Figure 1:
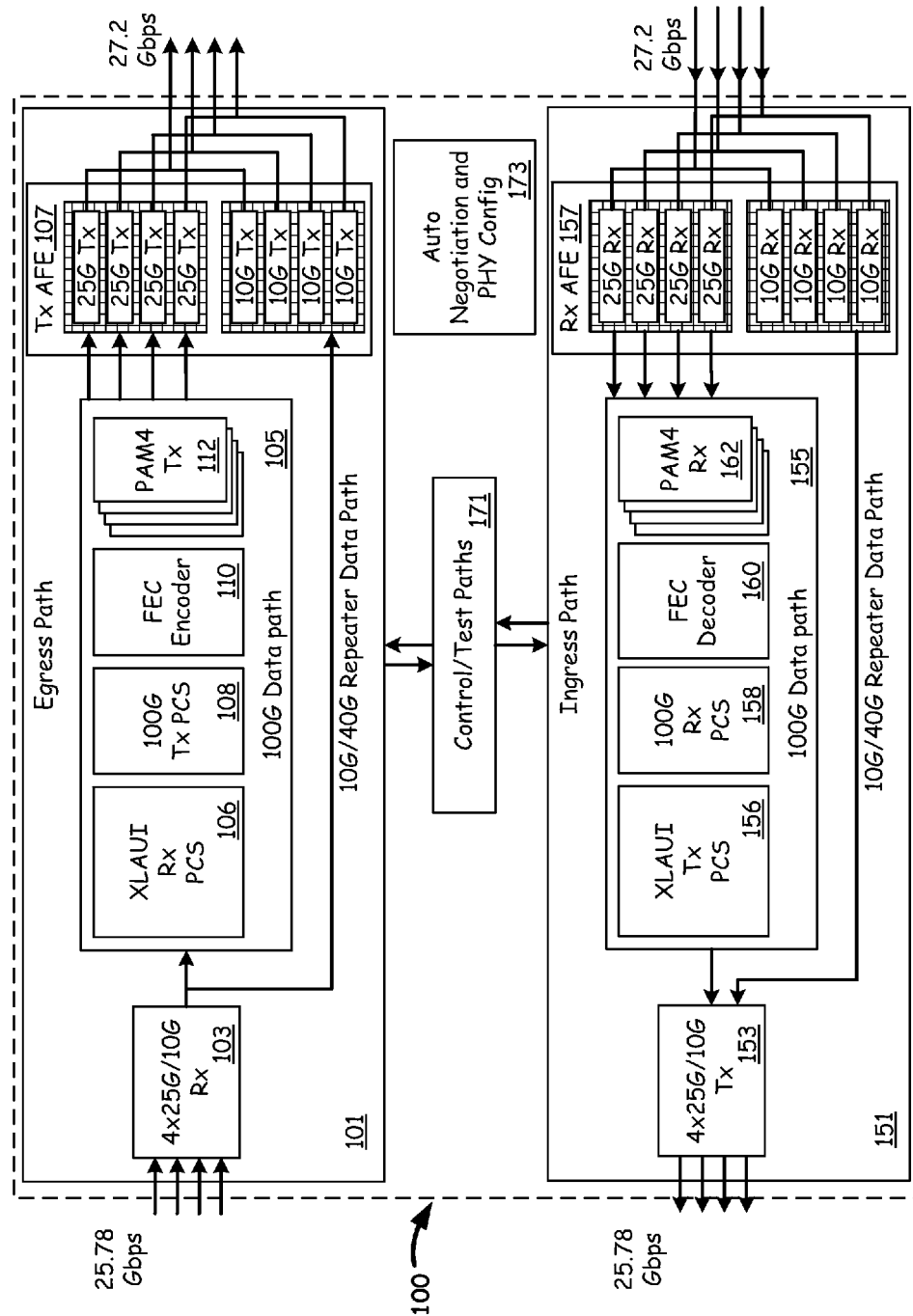
FIG. 1 illustrates an external PHY chip, as known to those of ordinary skill in the art.

Note that various embodiments remove some protocol termination and regeneration functions from the PHY chip 330 and put a reduced set of those functions into switch chip 310. For example, multilane distribution, transmit PCS, and FEC encoder functions, which may have been performed in the prior art PHY chip 100 (FIG. 1), can be moved to switch chip 310. Moving some or all of the functionality out of PHY chip 330, and transmitting NRZ data between switch chip 310 and PHY chip 330 at an increased rate that matches the data rate used by PAM4, allows NRZ data termination to be avoided, which in turn reduces the processing load on PHY chip 330.

Figure 4:
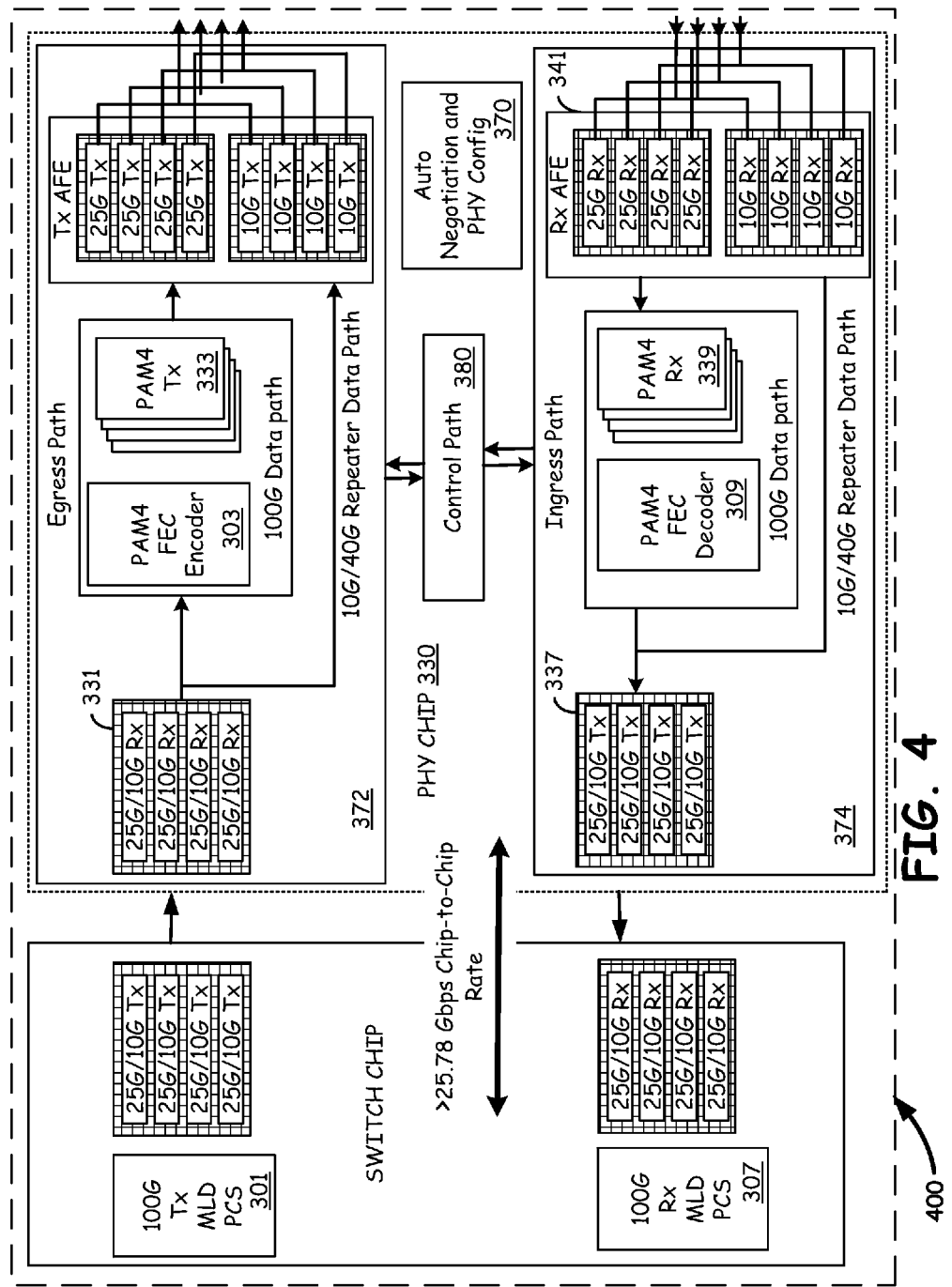
FIG. 4 illustrates a Switch Chip and a PHY chip communicating using "overclocked" NRZ data, with the FEC circuitry included in the PHY Chip, according to various embodiments of the disclosure.

Referring next to FIG. 4, an embodiment of a system 400 that includes switch chip 410 and a PHY chip 430 is illustrated. Like switch chip 310 (see FIG. 3), switch chip 410 includes 100 G Tx MLD PCS module 301, 100 G Rx MLD PCS module 307, and serdes modules 305 and 311. Unlike switch chip 310 (see FIG. 3), switch chip 410 does not include PAM4 FEC encoding and decoding functionality, which has been moved to PHY chip 430.

PHY chip 430 includes an egress path 372, an ingress path 374, internal control path 380, and Auto negotiation and PHY configuration block 370. PHY chip 430, like PHY chip 330 (see FIG. 3) includes serdes modules 331 and 337, PAM4 Tx module 333, PAM4 Rx module 339, TX AFE module 335, and Rx AFE module 341. In contrast to PHY chip 330 (see FIG. 3), PAM4 FEC encoder module 303 and PAM4 FEC decoder module 309 have been moved from switch chip 410 into PHY chip 430.

With the exception of FEC encoding and decoding being performed in the PHY chip instead of the switch chip, the functions performed by the modules included in switch chip 410 and PHY chip 430 are analogous to the functions performed by corresponding switch chip 310 and PHY chip 330, which are discussed in relation to FIG. 3. In some embodiments, although not specifically illustrated, FEC encoding and decoding functionality can be included in both the switch chip and the PHY chip, but used in only one chip or the other. In some such cases, auto negotiation and PHY configuration module 370 can be used to negotiate which one of the chips will perform the FEC encoding and decoding functions. Including FEC capabilities in both chips, but performing the FEC function in one of the chips, would allow greater flexibility and interoperability of different chips and devices, but still provide potential reductions in data latency and power consumption, especially if the unused FEC encoder or decoder is configured to be placed in an off, idle, or low power state.

Figure 5:
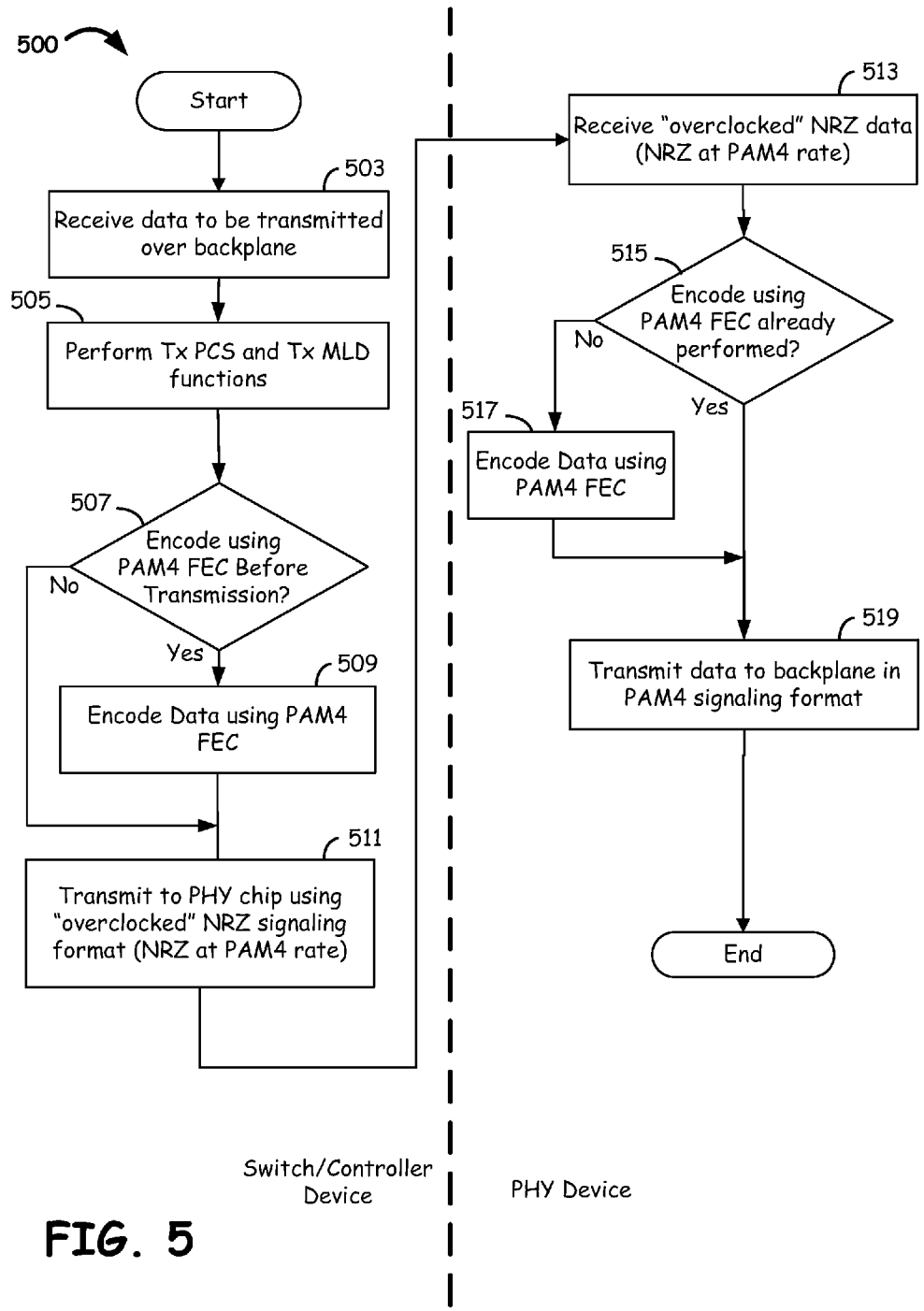
FIG. 5 is a flowchart illustrating transmitting data over a 100 GBASE-KP4 backplane, according to various embodiments of the disclosure.

Referring next to FIG. 5, a method 500 of transmitting data onto a backplane is illustrated and discussed according to various embodiments of the present disclosure. As illustrated by block 503, dated to be transmitted over a backplane is received at a device, such as a switch or controller. In many instances, the data received can be data encoded using an NRZ encoding protocol and formatted using an NRZ signaling format employing multiple different PCS lanes. An example of such data can be found in IEEE standard 802.3bj. As illustrated by block 505, transmitter side PCS and MLD functions can be performed on the NRZ data. As illustrated by block 507, in some embodiments a decision is made to determine whether to perform PAM4 FEC encoding. If the data is to be encoded into a PAM4 FEC structure at this point in the process 500, the encoding can be performed as illustrated by block 509. If no encoding is to be performed at this point, the method proceeds from block 507 to block 511. As illustrated by block 511, the NRZ data is transmitted to a PHY interface chip or device at an overclocked data rate. Thus, if PAM4 FEC encoding has already been performed at block 509, the PAM4 FEC encoded data is transmitted using an NRZ signaling format overclocked to a rate of 27.2 Gb/s, which is consistent with the data rate used in PAM4 signaling. If PAM4 FEC encoding is not been performed at block 509, block 511 illustrates transmitting NRZ encoded data at the same rate used by PAM4 signaling formats.

Thus the data transmitted from the switch/controller to the PHY device, regardless of whether the data has been subjected to PAM4 FEC encoding, as NRZ signaling formatted data at a PAM4 data rate of 27.2 Gb/s.

As illustrated by block 513, the overclocked NRZ data is received at the PHY device. A check is made at block 515 to determine whether or not PAM4 FEC encoding has Artie been performed at the switch/control device. If the PAM4 FEC encoding has not already been performed, the data is coded into a PAM4 FEC structure as illustrated by block 517. If the data has already been subjected to PAM4 FEC encoding, the data can be physically placed transmitted to a backplane in a PAM4 signaling format.

Figure 6:
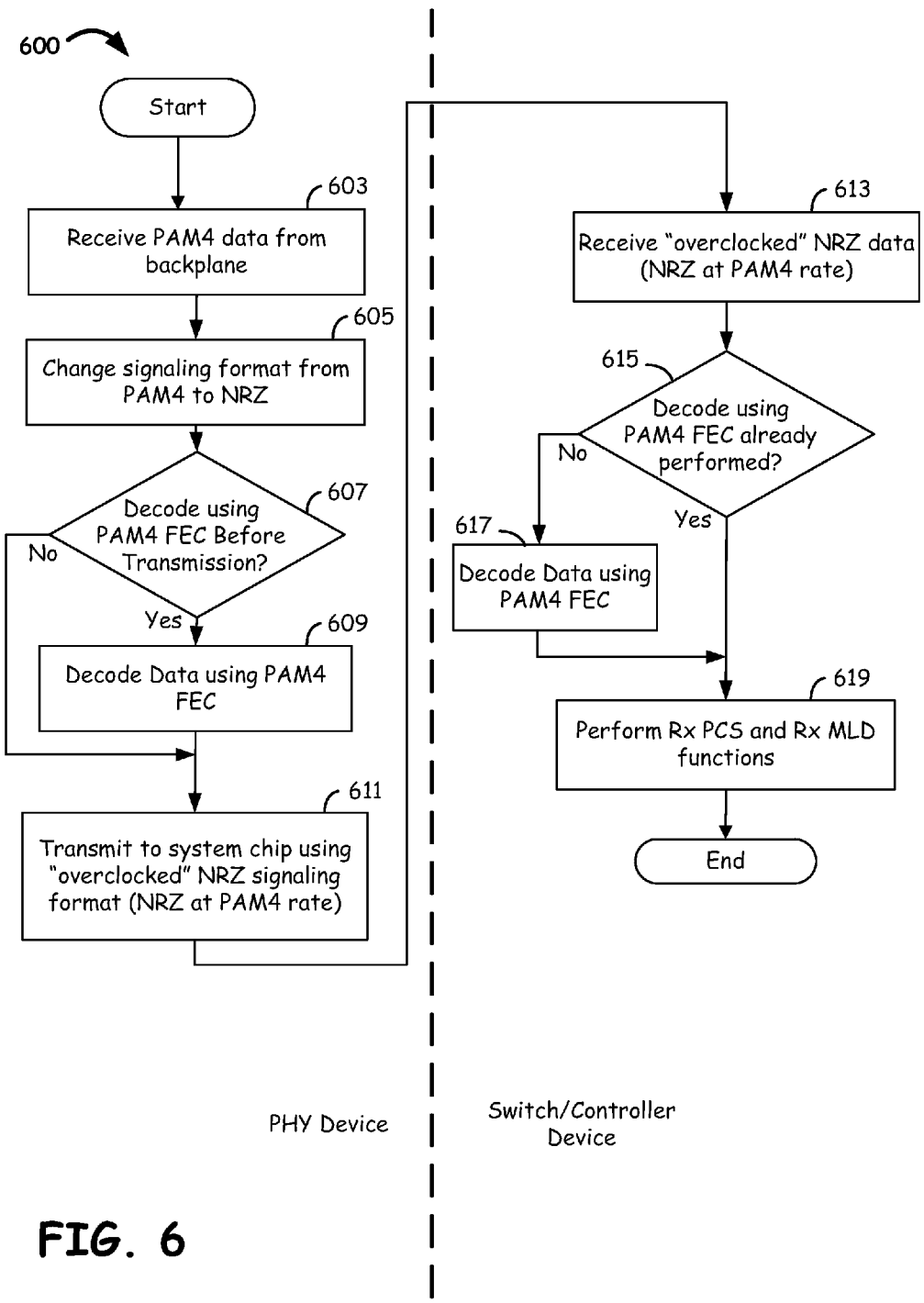
FIG. 6 is a flowchart illustrating receiving data transmitted over a 100 GBASE-KP4 backplane, according to various embodiments of the disclosure.

Referring next FIG. 6, a method 600 of receiving data from a backplane is illustrated and discussed according to various embodiments of the present disclosure. As illustrated by block 603, PAM4 data is received from the backplane. As illustrated by block 605, the PAM4 data is decoded, and a decision is made at block 607 to determine whether PAM4 FEC decoding should be performed prior to transmitting data to the switch/controller device. As illustrated by block 609, PAM4 FEC decoding is performed if necessary. If PAM4 FEC decoding is not to be performed by PHY device, the data is formatted into an NRZ signaling format to be sent to the switch/controller device as illustrated by block 611. When formatting the data into the NRZ signaling format, the original PAM4 data rate is maintained, so that instead of applying a standard NRZ data rate of 25.78 Gb/s, the NRZ signaling formatted data is sent to the switch controller device at an overclocked data rate of 27.2 Gb/s.

As illustrated by block 613, the switch/controller device receives the overclocked NRZ data and determines whether PAM4 FEC decoding has Artie been performed. If the PAM4 FEC decoding has not already been performed, it can be performed as shown by block 617. If the PAM4 FEC decoding has already been performed, then receive PCS and MLD functions are performed to format the data for output from the switch/controller device.

Reference has been made in the above detailed description to various standards that support, use, or require certain data rates or frequencies. For example, reference may have been made to IEEE standard 802.3bj, IEEE 802.3ba (100 GbE 100 gigabit Ethernet), 10 GbE, 40 GbE, 100 GBASE-KP4 (PAM4), 100 GBASE-KR4 or VSR 28 (NRZ), 10 GBE. Some or all of these standards may currently be in draft form, and may evolve over time, or be replaced by new standards, to encompass different frequencies or other parameters than those currently specified. The techniques described herein can be applied to other frequency and parameter regimens without departing from the spirit and scope of the disclosure. The above discussion may also use terminology specific to a particular data rate or standard. For example, the term XLAUI refers to a 40 Gb Attachment User Interface (where XL is the Roman numeral 40), but techniques similar to those described herein can also be used in conjunction with a CAUI, which refers to a 100 Gb Attachment User Interface (where C is the Roman numeral 100).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A system comprising:
    a system device coupled to a backplane via a PHY device;
    the system device comprising:
        a first system-side input configured to receive data encoded according to a first protocol, at a first signaling rate specified by the first protocol;
        a processor configured to alter the first signaling rate of the data encoded according to the first protocol without terminating the first protocol, wherein the first signaling rate is altered to match a second signaling rate specified by a second protocol;
        a first line-side output coupled to the PHY device, the line side output configured to transmit the data encoded according to the first protocol to the PHY device at the second signaling rate;
    the PHY device comprising:
        a second system-side input configured to receive the data encoded according to the first protocol at the second signaling rate;
        at least one processing module configured to transcode the data from the first protocol to the second protocol without altering the second signaling rate of the data; and
        a second line-side output coupled to the backplane, and configured to transmit the data according to the second protocol, at the second signaling rate, over the backplane.

2. The system of claim 1, wherein the system device comprises:
    a transmit multilane distribution (MLD) module; and
    a physical coding sublayer (PCS) module.

3. The system of claim 2, wherein the system device further comprises a Forward Error Correction (FEC) encoding module configured to operate in accordance with the second protocol.

4. The system of claim 2, wherein the PHY device further comprises a Forward Error Correction (FEC) encoding module configured to operate in accordance with the second protocol.

5. The system of claim 1, wherein:
    the first protocol specifies a non-return to zero (NRZ) signaling format; and
    the second protocol specifies a pulse amplitude modulation four (PAM4) signaling format.

6. The system of claim 1, wherein:
    the PHY device comprises:
        a line-side input configured to receive, from the backplane, data encoded according to the second protocol at the second signaling rate;
        at least one processing module configured to transcode the data from the second protocol to the first protocol without altering the second signaling rate of the data;
        a system-side output coupled to the system device and configured to transmit the data to the system device according to the first protocol, at the second signaling rate;
    the system device further comprises:
        a line-side input coupled to the system-side output of the PHY device and configured to receive data encoded according to the first protocol, at the second signaling rate, from the PHY device;
        a processor configured to alter the second signaling rate of the data encoded according to the first protocol, wherein the second signaling rate is altered to match the first signaling rate; and
        a system-side output configured to transmit the data encoded according to the first protocol to the PHY device at the first signaling rate.

7. The system of claim 1, wherein the system device is configured to alter the signaling rate without terminating the first protocol by performing transmit PCS functions on received data without first performing receive PCS functions on the received data.

8. A backplane interface device comprising:
    a system-side input configured to receive data encoded in a non-return to zero (NRZ) data format from a system-side device at a signaling rate conforming to a pulse amplitude modulation four (PAM4) signaling rate;

at least one processing module configured to transcode the data from the NRZ data format to a PAM4 data format without changing the signaling rate of the data; and a line-side output configured to transmit the data over a backplane configured for use with the PAM4 signaling rate.

9. The backplane interface device of claim 8, further comprising:

a line-side input configured to receive, from the backplane, data encoded in a PAM4 data format at a signaling rate conforming to the PAM4 signaling rate;

at least one processing module configured to transcode the data from the PAM4 data format to an NRZ data format without altering the signaling rate of the data; and a system-side output configured to transmit the data to an external device coupled to the system-side output.

10. The backplane interface device of claim 9, wherein:

a 100 gigabyte egress path within the backplane interface device comprises a PAM4 transmit module; and a 100 gigabyte ingress path within the backplane interface device comprises a PAM4 receive module.

11. The backplane interface device of claim 10, wherein:

the 100 gigabyte egress path comprises a PAM4 Forward Error Correction (FEC) encoder; and the 100 gigabyte ingress path comprises a PAM4 Forward Error Correction (FEC) decoder.

12. The backplane interface device of claim 8, wherein:

the NRZ signaling rate for 100 Gbps data is specified to be substantially 25.78 Gbps per lane; and the PAM4 signaling rate per lane is greater than the NRZ signaling rate per lane.

13. The backplane interface device of claim 8, wherein:

the backplane interface device comprises a PHY chip and the system-side device comprises one of a switch chip and a controller chip;

the PHY chip is coupled to the backplane and the system side device; and inter-chip communications between the PHY chip and the system device are performed at a rate determined by a signaling rate supported by the backplane.

14. A method for use in a device including a backplane, the method comprising:

altering a first signaling rate of data received at a first device and encoded according to a first protocol without terminating the first protocol, wherein the first signaling rate is altered to match a second signaling rate used to transmit data over the backplane;

transmitting the data between the first device and a second device, wherein the data remains encoded according to the first protocol, but is transmitted at the second signaling rate;

transcoding, at the second device, the data from a first data format specified by the first protocol to a second data format specified by a second protocol, wherein the second protocol further specifies transmission of data using the second signaling rate; and transmitting transcoded data from the second device to the backplane using the second signaling rate.

15. The method of claim 14, further comprising:

performing transmit multilane distribution (MLD) and physical coding sublayer (PCS) functions in the first device.

16. The method of claim 15, further comprising:

performing Forward Error Correction (FEC) encoding in the first device.

17. The method of claim 15, further comprising:

performing Forward Error Correction (FEC) encoding in the second device.

18. The method of claim 14, wherein:

the first protocol specifies a non-return to zero (NRZ) signaling format; and the second protocol specifies a pulse amplitude modulation four (PAM4) signaling format.

19. The method of claim 14, further comprising:

transcoding backplane data from the second format to the first format without changing a signaling rate of the backplane data, wherein the backplane data comprises data received at the second device from a backplane, the backplane data comprising data encoded in the second data format and transmitted at the second signaling rate;

transmitting transcoded backplane data from the second device to the first device using the second signaling rate;

at the first device, altering the signaling rate of the transcoded backplane data to match the first signaling rate; and transmitting the altered rate data from a system-side output of the first device.

20. The method of claim 14, further comprising:

performing transmit PCS functions on received data without first performing receive PCS functions on the received data.

* * * * *